(12) United States Patent
Cerwin

(10) Patent No.: US 7,447,565 B2
(45) Date of Patent: Nov. 4, 2008

(54) ELECTRONIC ALIGNMENT SYSTEM

(76) Inventor: John Cerwin, 373 St. Andrews La., Gurnee, IL (US) 60031

( * ) Notice: Subject to any disclaimer, the term of this patent is extended or adjusted under 35 U.S.C. 154(b) by 0 days.

(21) Appl. No.: 10/906,763

(22) Filed: Mar. 4, 2005

(65) Prior Publication Data

US 2005/0251294 A1   Nov. 10, 2005

Related U.S. Application Data

(60) Provisional application No. 60/568,595, filed on May 6, 2004.

(51) Int. Cl.
G06F 19/00 (2006.01)
G01M 1/38 (2006.01)

(52) U.S. Cl. .......................... 700/279; 700/59
(58) Field of Classification Search ................. 700/279; 73/488, 510, 512.16; 356/477; 83/561, 469; 701/41–44
See application file for complete search history.

(56) References Cited

U.S. PATENT DOCUMENTS

| | | | |
|---|---|---|---|
| 3,664,032 A | 5/1972 | Tompkins | |
| 3,864,839 A | 2/1975 | Wolf | |
| 3,979,165 A | 9/1976 | Pyle | |
| D246,947 S | 1/1978 | Glover | |
| 4,088,027 A * | 5/1978 | Hernandez et al. | 73/514.21 |
| 4,141,151 A | 2/1979 | Jansky | |
| 4,154,001 A | 5/1979 | Serafin | |
| 4,171,907 A | 10/1979 | Hill et al. | |
| 4,265,028 A | 5/1981 | Van Steenwyk | |
| 4,281,949 A | 8/1981 | Bugarin | |
| 4,393,599 A | 7/1983 | Sterrenberg | |
| 4,402,141 A | 9/1983 | Sterrenberg | |
| 4,432,146 A | 2/1984 | Klein | |
| 4,452,075 A | 6/1984 | Bockhorst et al. | |
| 4,461,088 A * | 7/1984 | Van Steenwyk | 33/304 |
| 4,503,622 A | 3/1985 | Swartz et al. | |
| 4,656,749 A | 4/1987 | Ashley et al. | |
| 4,765,784 A | 8/1988 | Karwan | |
| 4,785,544 A | 11/1988 | Heinsius et al. | |
| 4,813,822 A | 3/1989 | Biek | |
| 4,823,780 A | 4/1989 | Odensten et al. | |

(Continued)

OTHER PUBLICATIONS www.analog.com, Analog Device, Inc., 2000, p. 1-12.*

(Continued)

*Primary Examiner*—Kidest Bahta
(74) *Attorney, Agent, or Firm*—Christopher Wood; Wood & Eisenberg, PLLC

(57) ABSTRACT

An electronic alignment system is disclosed. The system has at least two accelerometers, mounted in the device in such a manner that the accelerometers are mutually perpendicular to one another. An electrical connection electrically connects the accelerometers, a computing and processing device, a memory device, a feedback device, and a power source. A three axis reference frame is used as a basis for determining the angle of rotation of the device about an axis. Two accelerometers are required to determine a first angle of rotation. Adding a third accelerometer allows for the calculation of a second angle of rotation. Distance sensors can determine distance to a work piece, how far the device has traveled relative to a work piece, areas and volumes, and a third angle of rotation. Gyroscopes can also determine a third angle of rotation. The device may also include light projectors.

4 Claims, 15 Drawing Sheets

U.S. PATENT DOCUMENTS

| | | | |
|---|---|---|---|
| 4,824,367 A | 4/1989 | Rosenstiel et al. | |
| D305,202 S | 12/1989 | Johnson | |
| 4,912,662 A | 3/1990 | Butler et al. | |
| 4,923,341 A | 5/1990 | Cameron | |
| 4,961,674 A | 10/1990 | Wang et al. | |
| 4,973,205 A | 11/1990 | Spaulding | |
| 5,031,329 A | 7/1991 | Smallidge | |
| 5,078,552 A | 1/1992 | Albel | |
| 5,246,197 A | 9/1993 | MacDonald | |
| 5,312,409 A | 5/1994 | McLaughlin et al. | |
| 5,314,271 A | 5/1994 | Christiano | |
| 5,322,396 A | 6/1994 | Blacker | |
| 5,331,578 A | 7/1994 | Stieler | |
| 5,361,504 A | 11/1994 | Huang | |
| 5,382,120 A | 1/1995 | Parsons | |
| 5,403,322 A | 4/1995 | Herzenberg et al. | |
| 5,538,423 A | 7/1996 | Coss et al. | |
| 5,584,838 A * | 12/1996 | Rona et al. | 606/96 |
| 5,638,303 A * | 6/1997 | Edberg et al. | 700/302 |
| 5,690,451 A | 11/1997 | Thurler et al. | |
| 5,720,355 A | 2/1998 | Lamine et al. | |
| 5,739,431 A | 4/1998 | Petri | |
| D397,948 S | 9/1998 | Bowen | |
| 5,810,828 A | 9/1998 | Lightman et al. | |
| 5,817,098 A | 10/1998 | Albrektsson et al. | |
| 5,941,706 A | 8/1999 | Ura | |
| 6,000,939 A | 12/1999 | Ray et al. | |
| 6,102,631 A | 8/2000 | Nyari | |
| 6,186,708 B1 | 2/2001 | Fridman | |
| 6,285,111 B1 * | 9/2001 | Hulsing, II | 73/514.29 |
| 6,328,505 B1 | 12/2001 | Gibble | |
| 6,351,891 B1 | 3/2002 | MacGugan | |
| 6,360,446 B1 | 3/2002 | Bijawat et al. | |
| 6,375,395 B1 | 4/2002 | Heintzemann | |
| 6,478,802 B2 | 11/2002 | Kienzle, III et al. | |
| 6,499,219 B1 | 12/2002 | Wightman | |
| 6,543,971 B2 | 4/2003 | Mawhinney | |
| 6,708,132 B1 * | 3/2004 | Gutierrez et al. | 702/117 |
| 6,823,879 B2 * | 11/2004 | Fillipi et al. | 134/94.1 |
| 6,873,931 B1 * | 3/2005 | Nower et al. | 702/151 |
| 6,895,678 B2 * | 5/2005 | Ash et al. | 33/313 |
| 6,909,948 B2 * | 6/2005 | Mollmann et al. | 701/29 |
| 7,108,079 B2 * | 9/2006 | Sakai et al. | 173/217 |
| 7,152,333 B1 * | 12/2006 | Chou | 33/203.18 |
| 2002/0002864 A1 * | 1/2002 | Kvisteroey et al. | 73/504.12 |
| 2002/0040601 A1 * | 4/2002 | Fyfe et al. | 73/490 |
| 2003/0204361 A1 * | 10/2003 | Townsend et al. | 702/144 |
| 2005/0116673 A1 * | 6/2005 | Carl et al. | 318/432 |
| 2006/0166738 A1 * | 7/2006 | Eyestone et al. | 463/36 |

OTHER PUBLICATIONS

Back to Back Accelerometer Calibration, www.dytran.com.*
Author: Unknown, "Digital Inclinometer Laser Level", Date: Unknown, Publisher: Unknown, City/Country: Unknown.
Author: Unknown, "LaserAce", Date: Unknown, Publisher: Unknown, City/Country: Unknown.
Author: Unknown, "Laser Advantage Rangefinder", Date: Unknown, Publisher: Unknown, City/Country: Unknown.
Author: Unknown, "Delta CL144 14.4-Volt Drill Driver", Date: Unknown, Publisher: Unknown, City/Country: Unknown.
Author: Unknown, "Beall Inclinometer", Date: Unknown, Publisher: Unknown, City/Country: Unknown.
Author: Unknown, "ADXL103/ADXL203", Date: 2006, Publisher: Analog Devices, City/Country: Norwood, MA, U.S.A.
Author: Unknown, "Corner Adapting Motorcycle Headlight", Date: Unknown, Publisher: Unknown, City/Country: Unknown.
Author: Unknown, "Inclinometer Portable Data Logger Model ACCULOG-X", Date: Unknown, Publisher: Unknown, City/Country: Unknown.
Author: Unknown, "Bosch DWM40L Miter Finder Digital Protractor/Angle Finder", Date: Unknown, Publisher: Unknown, City/Country: Unknown.

* cited by examiner

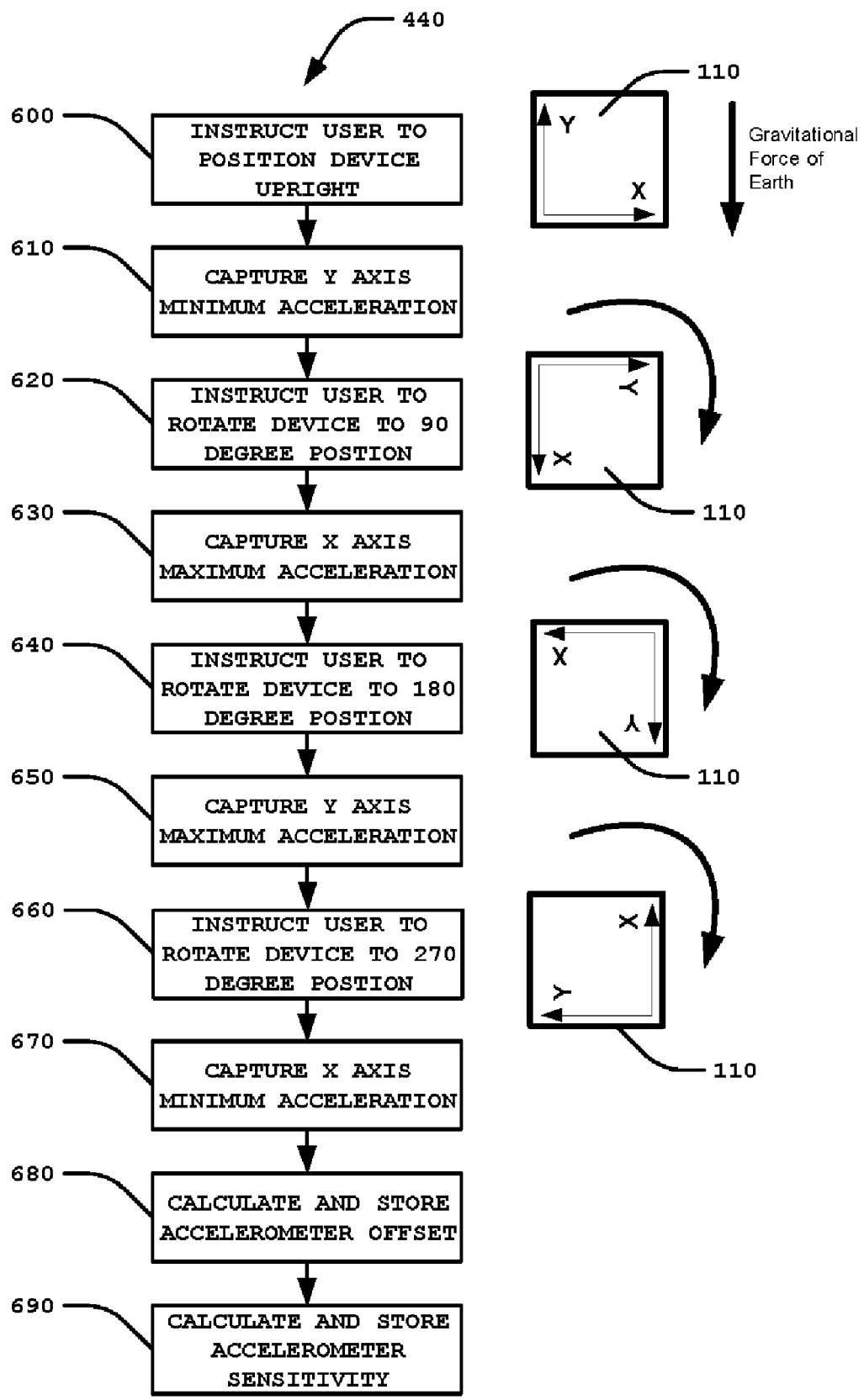

ELECTRONIC ALIGNMENT SYSTEM

CROSS REFERENCE TO RELATED APPLICATION

This application claims the benefit of the following U.S. Provisional Patent Application No. 60/568,595, filed May 6, 2004, which is hereby incorporated by reference in its entirety.

DESCRIPTION OF THE RELATED ART

The present invention relates to leveling and alignment devices, and more specifically to an electronic alignment device, such as a level, and a method for aligning a device with respect to the axes of a reference frame.

In the fields of engineering, surveying, construction, and architecture, it is common practice to use a measurement tool to capture parameters about an object or structure, such as distance, angle, pitch, or width. These measurements are subsequently subjected to various computations or calculations, with the intent of deriving meaningful design or construction related parameters. Similar tools and devices have been developed to assist members of other fields. Comparable tools and devices have also been developed to assist the "do-it-yourselfer" with home repair and improvement projects.

Levels and leveling devices have been used quite extensively in the fields mentioned above. Typical examples of levels include spirit, bubble, and bullseye levels. In these types of levels, a glass or see-through plastic container is partially filled with a fluid and then sealed. Since the container is not completely filled, there remains in the container a small pocket or bubble of air or gas. The air, being less dense than the liquid, automatically floats to the highest position in the container. Tilting of the container will result in a corresponding movement of the air pocket. This movement can be calibrated to correspond to identify when the level is at a desired angle relative to a horizontal or vertical line or plane. The accuracy is dependent on how well the user can align the air pocket within the container to reference marks on the container.

Besides simple levels, that is a device where a container of the type described above is attached to an object having at least one flat side, levels of the type described above have been incorporated into tools or other devices. For example, see U.S. Pat. No. 3,864,839, issued to Wolf, which discloses a power hand drill having two circular bubble type levels mounted on the drill housing. In Wolf, one bubble level is perpendicular to the axis of the drill and one bubble level is normal to the axis of the drill. In addition to the accuracy problems of these types of levels, discussed above, Wolf has the added disadvantage that the user must watch two separate bubble levels at one time to maintain proper alignment during drilling. Additionally, the bubble levels will only help to align the drill vertically and horizontally with respect to Earth's gravity. The bubble levels on the drill in Wolf cannot be used for alignment to anything but true vertical and true horizontal.

Other devices have been created to help align tools, particularly drills. For example, U.S. Pat. No. 6,375,395, issued to Heintzeman, discloses a laser device mounted on the casing of a drill such that the laser is in line with the drill bit. A bubble level is also included to help align the drill vertically or horizontally. While the laser may be useful in aligning the drill tip to a particular point, the use of levels restricts alignment of the drill to true vertical and horizontal.

Measuring the depth of a drill hole or the distance an object or tool has moved is also helpful to the skilled artisan. Typically depth of a drill hole is determined from markings on the drill bit. See U.S. Pat. No. 5,941,706, issued to Ura, which discloses a medical drill bit with one or more colored bands to indicate drilling depth. Alternatively, a stop mechanism is used, where a user sets a guide, offset from the drill bit, at a predetermined length, such that when the drill bit has traveled a desired distance into the work material, the guide touches the work material. See U.S. Pat. No. 5,690,451, issued to Thurler, et al., which discloses a depth stop assembly for a portable electric drill.

A more complex system for positioning a drill bit is shown in U.S. Pat. No. 6,478,802, issued to Kienzel, III et al. Kienzel, III discloses a computer assisted surgery system for accurate positioning of a drill bit into a body part. The system includes a drill guide and a drill with attached localizing emitters whose locations are determined by a localizing device. During drilling, the drill bit is inserted through the bore of the drill guide and the position of the drill bit is calculated from measured position data of both the drill guide and the drill. While such a system may be useful in the medical field, the system is not convenient for use outside the controlled area of the surgical suite.

A digital level is disclosed in U.S. Pat. No. 5,031,329, issued to Smallidge. The Smallidge level operates on the same principle as the spirit and bubble levels discussed above with digital electronics added in. The Smallidge level uses a hermetically sealed bladder partially filled with an electrically conductive liquid and partially filled with a gas. The electrically conductive liquid is free to align itself within the bladder in response to the inclined of a surface. Current probes placed within the hermetically sealed bladder measure the electrical resistance of the electrically conductive liquid, and electronic circuitry converts this measured resistance into an electrical signal having an amplitude proportional to slope.

Another digital level is disclosed in U.S. Pat. No. 4,912,662, issued to Butler et al. The Butler level, or inclinometer, has a sensing unit for providing a varying capacitance signal depending on the orientation of the inclinometer. An oscillator circuit unit includes the sensor unit as a capacitive element for providing a signal having a period and a frequency depending on the capacitance of the sensor unit. A unit is provided for determining the period of the signal. A look-up table unit stores a predetermined relationship between the period of the signal and the angle of orientation of the inclinometer. A comparison unit then compares the period of the signal to the period stored in the look-up table unit and selects the corresponding angle which is the angle of orientation of the inclinometer. The angle is then displayed on the inclinometer display.

Recently, another type of alignment device has been widely marketed. These products art generally referred to as "laser levels". These "laser levels" are characterized by a light source that is projected in a beam or fan-like fashion along a wall or other object. U.S. Pat. No. 6,360,446, issued to Bijawat et al., disclosed a level having a laser beam source. Bijawat discloses a level that comprises a body, a body orientation detector, a laser beam source, a laser beam configuring lens, and a manually engageable lens switch. The body orientation indicator is carried by the body and constructed and arranged to indicate an orientation of the body. The laser beam source is carried by the body and constructed and arranged to emit a laser beam from the body to a location on a surface remote from the body, the laser beam being directed at a predetermined orientation with respect to the body to interrelate the orientation of the body with respect to the location on the surface remote from the body. The laser beam configuring lens assembly is carried by the body and movable between a first position and a second position with respect to the laser beam source. The laser beam configuring lens assembly splits the laser beam emitted by the laser beam source into a cross-hair beam configuration when the laser beam configuring lens is in the first position, and enables the beam to be transmitted as a point beam that projects a point of illumination onto the remote surface when the laser beam configuring lens assembly is in the second position. The manually-engageable lens switch is carried by the body and coupled to the laser beam configuring lens assembly. The lens switch is manually movable to move the laser beam configuring lens assembly between the first and second positions thereof.

Also becoming increasing popular are products generally referred to as "project calculators". Project calculators are used by professionals and do-it-yourselfers to determine material needs and other information for specific types of home improvement and construction projects. As of yet, these project calculators have not been incorporated into devices that make the measurements. Thus the user is forced to make measurements with one or more tools, record the information into the project calculator, and then perform the necessary calculation on the calculator.

Other recent developments in the tool industry include electronic distance measurement devices. These devices use sound or light to measure distances. These devices are intended to replace the traditional measuring tape or similar distance measuring devices. Advanced models of these distance measuring devices have a memory function and can perform basic mathematic operations on measurements, such as multiplying two distance measurements to get an area. However, these devices typically only measure one distance at a time, thus the user must make separate measurements for each distance. Making multiple measurements increases the risk of measurement error and adds multiple steps to the measurement process.

However, there remains a need for a device that can help align an object, a tool, or other device, not just vertically and horizontally, but with respect to any axis in space. There also remains a need for a device that can make multiple distance measurements simultaneously. There also remains a need for a device that can improve upon project calculation device and incorporate project calculation features into measurement and alignment devices. Thus, it would be advantageous to provide a device that can determine angles of rotation about the axes of a three axis reference frame. It would be advantageous to provide a device that can also determine how far the device is from a static object and determine how far the device has traveled relative to a work surface or work piece. It would also be advantageous to provide a distance measuring device that can measure multiple distances simultaneously. Furthermore, it would be advantageous to provide a device that integrates measurement capture capabilities with a computational engine that allows the device to acquire measurements and convert them into useful parameters.

SUMMARY

In view of the deficiencies described above, it is an object of the present invention to provide a system that can determine the angles of rotation about the axes of a reference frame.

It is a further object of the present invention to provide a system that can measure a distance from a work piece or work surface and, if applicable, determine how far the device has moved relative to the work piece or work surface.

It is a further object of the present invention to provide a distance measuring device that can measure multiple distances simultaneously.

It is a further object of the present invention to provide a device that integrates measurement capture capabilities with a computational engine that allows the device to acquire measurements and convert them into design, construction, or other useful parameters.

The present invention is an electronic alignment device having at least two accelerometers, where the accelerometers are mounted in device in such a manner that the accelerometers are mutually perpendicular to one another. The accelerometers are electrically connected to a microcontroller, or other computing and processing device. A printed circuit board, or other electrical connection means, electrically connects the accelerometers, the microcontroller, a memory device, a feedback device, and a power source.

The accelerometers are used to measure the relative direction to the gravitational force of the Earth. A full 360 degrees of orientation can be measured by using two accelerometers that are mounted perpendicularly to one another. Three mutually perpendicular accelerometers are required to measure rotation about two axes. The accelerometers can each be packaged individually or in an assembly having multiple accelerometers.

A three axis reference frame is used as a basis for determining the angle of rotation of the device about an axis. Pitch is rotation about an axis that runs laterally through the body of the device. Roll is rotation about an axis that runs longitudinally through the body of the device. Yaw is rotation about an axis that runs vertically through the body of the device. Two accelerometers are required to determine a first angle of rotation, for example, pitch. Adding a third accelerometer allows for the calculation of a second angle of rotation, e.g., roll or yaw (depending on the orientation of device and the reference frame).

The accelerometers in the present invention can be conventional single or multiple axis accelerometers or preferably single or multiple axis micro-electro-mechanical system accelerometers. Micro-Electro-Mechanical Systems (MEMS) is the integration of mechanical elements, sensors, actuators, and electronics on a common silicon substrate through micro-fabrication technology. MEMS accelerometers are advantageous because they can be incorporated directly onto or into a small silicon chip at relatively low cost. To improve performance, thermal compensated accelerometers may be used.

A third angle of rotation may be determined using a variety of systems and methods. In various embodiments gyroscopes, known in the art, are used to determine a third angle of rotation. The gyroscopes can be MEMS gyroscopes or other types known in the art. In other various preferred embodiments, distance sensors are used to determine a third angle of rotation.

A first distance sensor can be used in a static condition to determine a first distance, such as the distance from the sensor to a work piece. Changes in the first distance, a dynamic condition, can be used to determine how far the device has traveled relative to the work piece. This information can be used, for example, to determine the depth of a drill hole. A second distance sensor, pointed in the same direction as the first distance sensor, can be used to determine a second distance. Relative changes in the first and second distances are used to calculate the third angle of rotation about an axis of the reference frame. Distance sensors are not dependant on Earth's gravity, and thus the distance sensors can be used to determine rotation in any orientation.

Distance sensors can be of any type known in the art. Preferably the distance sensors are one of three types, either infrared distance sensors, ultrasonic distance sensors, or laser distance sensors.

In various embodiments, distance sensors may also be used to measure distances, areas, and volumes. To measure volume, three distance sensors, each aligned with one of the three axes of the reference frame. One distance sensor can measure distance along each axis. The product of the distances results in a volume. Any two distances can be used to calculate an area. Optionally, laser or other light projecting devices that project one or more lines of visible light from the device may be incorporated into the device and aligned with the distance sensors to help align the device and show the user where the measurements will be taken.

The microcontroller is the computing and processing unit for the device. The microcontroller has computer code operable in the microcontroller that provides computer implemented means for initializing the device, initializing the accelerometers, distance sensors and or gyroscopes, resetting or establishing a zero point for the accelerometers, distance sensors and or gyroscopes, calibrating the accelerometers, distance sensors and or gyroscopes, calculating angles of rotation about the axes of the reference frame, calculating distances, reading and writing data to the memory device, and driving the feedback device.

Optionally, the microcontroller has computer code that provides computer implemented means for a computational engine for engineering, survey, construction, architectural, and other calculations. The computational engine allows the device to acquire measurements from the accelerometers, distance sensors and or gyroscopes and convert them into design, construction, or other useful parameters. For example, the microcontroller can include calculations for determining pitch of a roof, twist and or deflection of a beam, and elevation change between survey markers from accelerometer and distance sensor measurements. Other calculations can include, but are not limited to, volume of a room, penetration rate of a drill, material estimation for painting, roofing or siding, angle of a table saw blade, hand tool sharpening angles, step or stringer layout, or rafter and joist design. Additionally, the microcontroller can include computer code that provides computer implemented means for converting units of measure into other units, such as radians to degrees or SI units to English units and vice versa. The computer code can include a data lookup table or other means known in the art for accessing stored information. Lookup table information can include data specific to fields or endeavors, such as cabinet making, framing, roofing, siding, painting, decorating, tiling, machining, landscaping, construction, automotive repair, recreational vehicle operation, or hobby modeling, just to name a few. For example, in the construction field, lookup table data may include, but is not limited to board design values, girder spans, R-values, surveyor conversion charts, properties of materials, or measurement conversions.

The feedback device can be any one or any combination of visual, audible, or tactile feedback mechanisms. Visual feedback can be in any one or any combination of alpha, numeric, graphical or indicator formats. In various embodiments, a liquid crystal display displays the angles of rotation and or the distance measurements. A light emitting diode array or other visual feedback means known in the art may also be used to give visual feedback. Audible feedback can be in the form of buzzers or tones that activate when predetermined conditions are met, such as a certain distance of travel has been made or the device has rotated more than a predetermined amount about one or more of the axes of rotation. Voice synthesis may also be used for audible feedback. Tactile feedback can be in to form of a Braille pad, coded vibrations, or other tactile feedback means known in the art.

The power source is preferably a battery of some type known in the art, which would be integral to the device. Having an integral power source eliminates the need for the device to be tethered to a power source via a power cord.

The device of the present invention can be incorporated as an integral part of another apparatus. For example, the present invention may be built into a drill, level, saw, powder activated driver, or protractor by a manufacturer. Alternately, device can be a stand alone unit, for use with or for mounting on another apparatus, such as a drill or conventional bubble type level. In these instances the device can be built into a housing. Preferably the housing has a removable portion for accessing the power source, such as for replacing a battery. Preferably the housing has a feedback device, such as a display capable of showing numbers, letters, or symbols. Ideally the feedback device display is positioned to allow for easy viewing when the device is being used. Optionally, feedback device display can tilt and or swivel for optimal viewing. The housing can also incorporate buttons and or switches, or other input and control means known in the art, that are used to turn the device on and off and to access available menu functions programmed into the microcontroller or computing and processing means. Furthermore, the housing can include means for attaching the device to a tool or object. The attachment means can include, but is not limited to, magnets located on one or more surfaces of the housing, or threaded portions for receiving a threaded members.

In various embodiments, additional features can be added, singularly or in combination, to the device. For example, device may include laser or other light projecting devices that project one or more lines of visible light from the device. Such lines can be used to effectively extend the edges of device as well as assist in aligning the device with one or more other objects. Additionally, one or more traditional spirit or bubble levels can be included in the device. Inclusion of traditional spirit or bubble level can help a user make preliminary alignments, serve as a redundant measurement technique, and or serve as a visual confirmation of the device operation to a new user.

Other features and advantages of the invention will be apparent from the following detailed description taken in conjunction with the following figures, wherein like reference numerals represent like features.

BRIEF DESCRIPTION OF THE DRAWINGS

FIG. 9d shows a process for initial setup of an electronic alignment device for an electronic alignment device according to the present invention.

DETAILED DESCRIPTION OF THE INVENTION

Figure 1A:
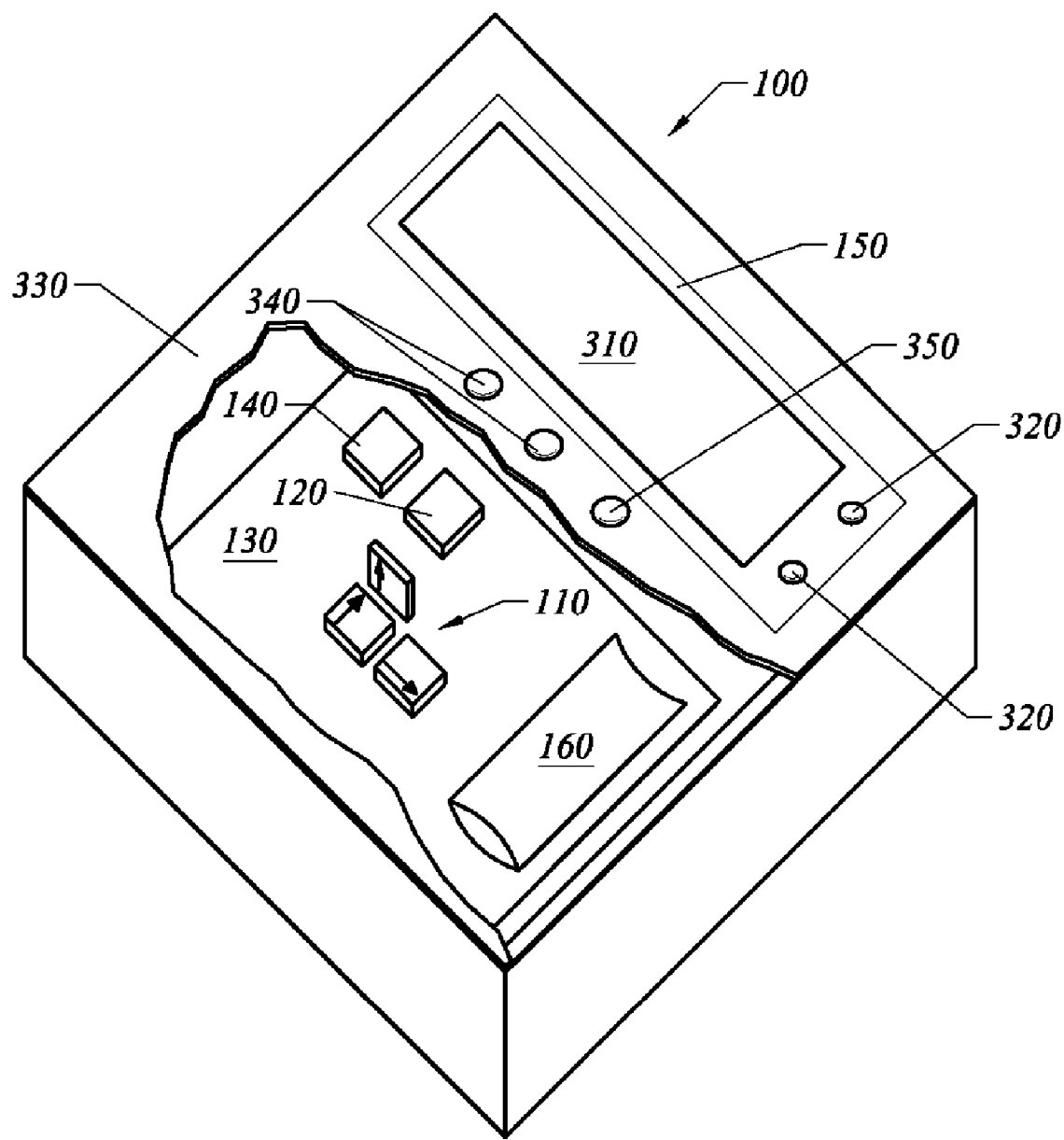
FIG. 1a shows a perspective view of an electronic alignment device according to the present invention having a section thereof cut away.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

Figure 1B:
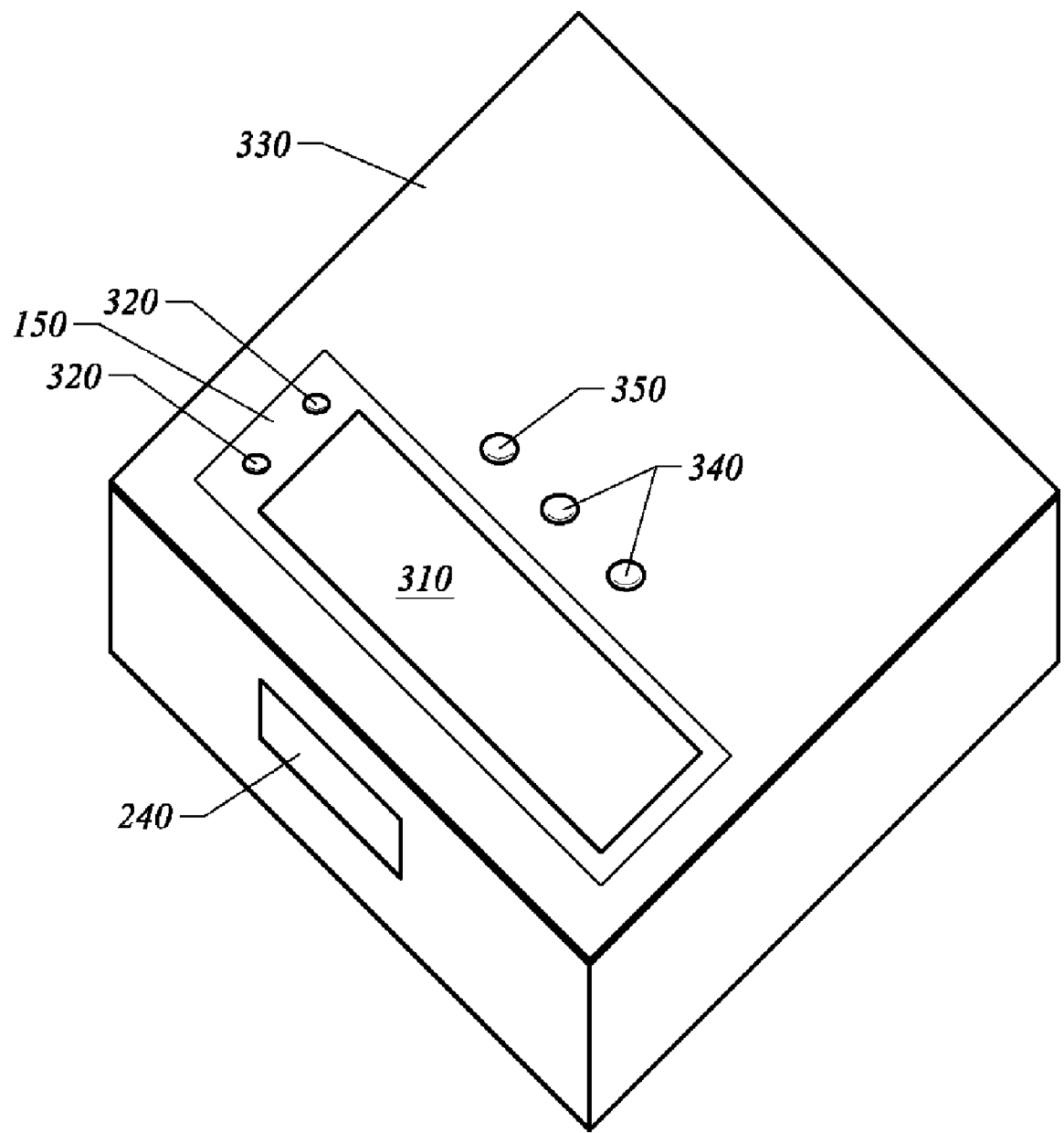
FIG. 1b shows an alternate perspective view of an electronic alignment device according to the present invention.

The present invention is an electronic alignment device 100 having at least two accelerometers, where the accelerometers 110 are mounted in device 100 in such a manner that the accelerometers 110 are mutually perpendicular to one another. FIGS. 1a and 1b show an electronic alignment device 100 according to the present invention. The accelerometers 110 are electrically connected to a microcontroller 120, or other computing and processing device known in the art. A printed circuit board 130, or other electrical connection means, electrically connects the accelerometers 110, the microcontroller 120, a memory device 140, such as an EEPROM or other memory device known in the art, a feedback device 150, and a power source 160. The skilled artisan will appreciate that items such as the printed circuit board 130, the microcontroller 120, and memory device 140 can be replaced by other electronic components that provide similar functionality, including, but not limited to, integrated circuits. In various preferred embodiments, the memory device 140 has non-volatile persistent memory capabilities.

The accelerometers 110 are used to measure the relative direction to the gravitational force of the Earth. A full 360 degrees of orientation can be measured by using two accelerometers 110 that are mounted perpendicularly to one another. As used herein, the term accelerometer 110 is refers to a device capable measuring static or dynamic acceleration in a single direction. Static acceleration is produced by the force of gravity and dynamic acceleration is produced by movement. Two accelerometers 110, perpendicular to one another, are required to measure rotation about a single axis. Three mutually perpendicular accelerometers 110 are required to measure rotation about two axes. Accelerometers 110 can each be packaged individually or in an assembly having multiple accelerometers 110.

Figure 2:
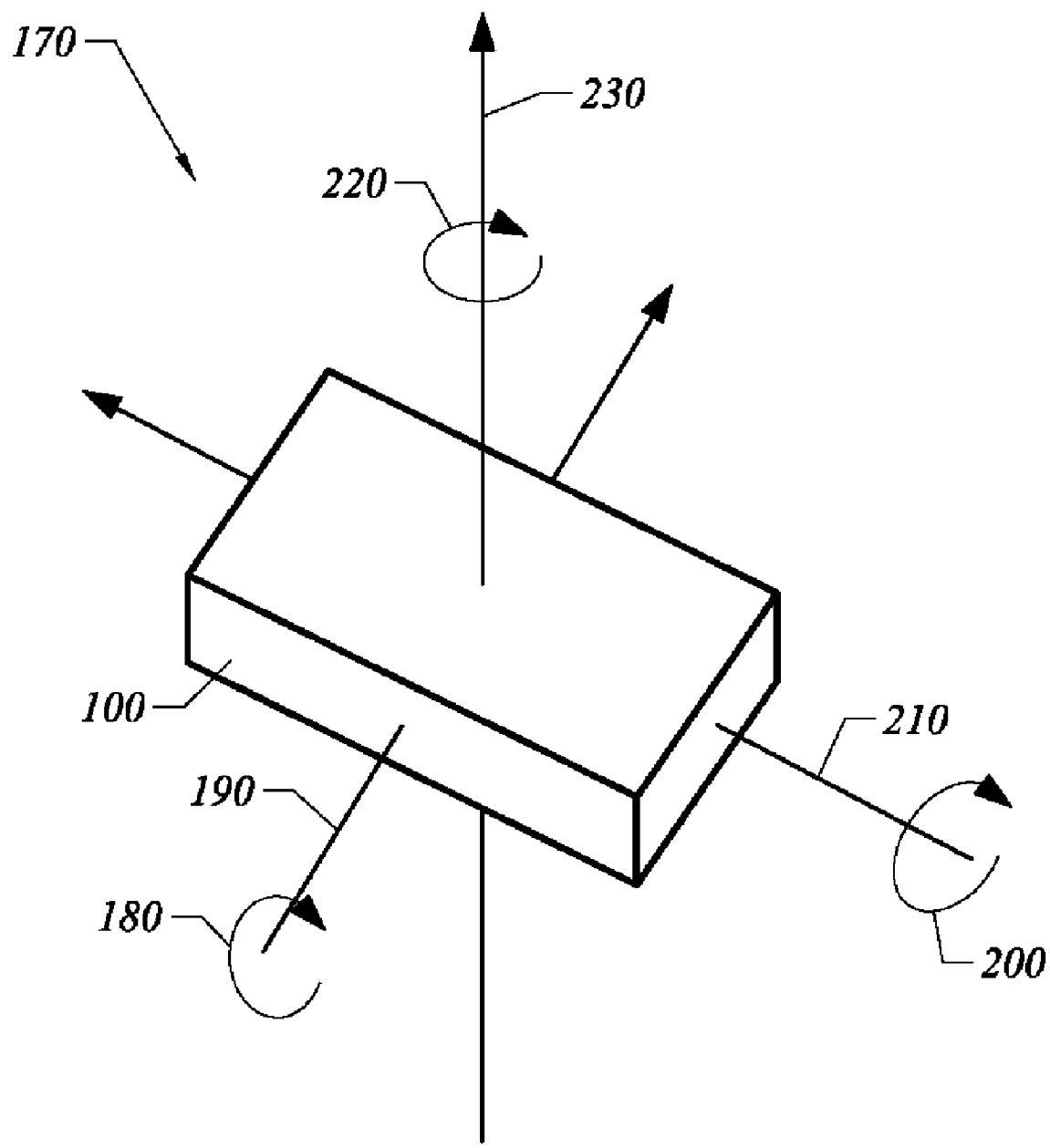
FIG. 2 shows a three axis reference frame in accordance with the present invention.

A three axis reference frame 170 is used as a basis for determining the angle of rotation of the device 100 about an axis. FIG. 2 shows a three axis reference frame 170 in accordance with the present invention. Pitch 180 is rotation about an axis that runs laterally 190 through the body of the device 100. Roll 200 is rotation about an axis that runs longitudinally 210 through the body of the device 100. Yaw 220 is rotation about an axis that runs vertically 230 through the body of the device 100. Two accelerometers 110 are required to determine a first angle of rotation, for example, pitch 180. Adding a third accelerometer 110 allows for the calculation of a second angle of rotation, e.g., roll 200 or yaw 220 (depending on the orientation of device 100 and the reference frame 170).

The accelerometers 110 in the present invention can be conventional single or multiple axis accelerometers or preferably single or multiple axis micro-electro-mechanical system accelerometers. Micro-Electro-Mechanical Systems (MEMS) is the integration of mechanical elements, sensors, actuators, and electronics on a common silicon substrate through micro-fabrication technology. MEMS accelerometers are advantageous because they can be incorporated directly onto or into a small silicon chip at relatively low cost. To improve performance, thermal compensated accelerometers may be used. Thermal MEMS accelerometers have a high shock tolerance, are more resistant to contamination factors, and tend to have lower failure rates in comparison to other devices.

A third angle of rotation may be determined using a variety of systems and methods. In various embodiments gyroscopes (not shown), known in the art, are used to determine a third angle of rotation. For example, the gyroscopes may be MEMS gyroscopes or other types of gyroscopes known in the art. Gyroscopes are not dependant on Earth's gravity, and thus gyroscopes can be used to determine rotation in any orientation. In other various preferred embodiments, distance sensors are used to determine a third angle of rotation.

A first distance sensor 240 can be used in a static condition to determine a first distance, such as the distance from the sensor 240 to a work piece. Changes in the first distance, a dynamic condition, can be used to determine how far the device 100 has traveled relative to the work piece. This information can be used, for example, to determine the depth of a drill hole. A second distance sensor 240, pointed in the same direction as the first distance sensor, can be used to determine a second distance. Relative changes in the first and second distances are used to calculate the third angle of rotation about an axis of the reference frame 170. Distance sensors 240 are not dependant on Earth's gravity, and thus the distance sensors 240 can be used to determine rotation in any orientation.

Figure 3:
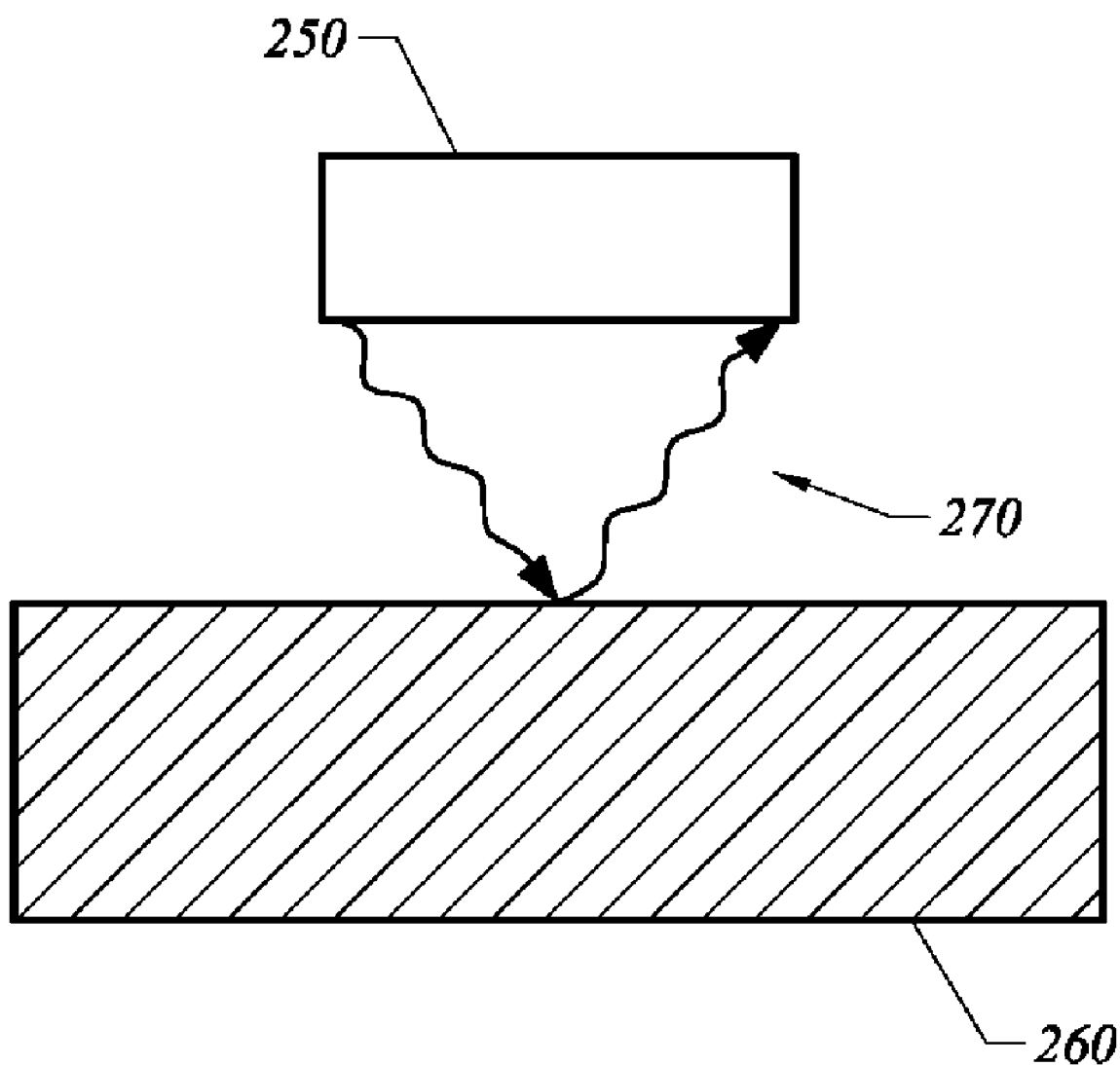
FIG. 3 shows an infrared distance sensor as part of an electronic alignment device according to the present invention.

Distance sensors 240 can be of any type known in the art. Preferably the distance sensors 240 are one of three types, either infrared (IR) distance sensors 250, ultrasonic distance sensors 280, or laser distance sensors (not shown). FIG. 3 shows an IR distance sensor 250 as part of an electronic alignment device 100 according to the present invention. An IR distance sensor 250 uses non-visible light to measure distance from an object 260. IR distance sensors 250 use triangulation and a small linear CCD array (not shown) to measure the distance from objects 260 in the sensor's 250 field of view. A pulse of IR light is emitted by an emitter (not shown). The light pulse travels out in the field of view until it hits an object 260 and is reflected back to a detector (not shown) in the sensor 250. A triangle 270 is created between the emitter, the object 260, and the detector. The angles in the triangle 270 vary based on the distance to the object 260. The detector has a receiver that includes a precision lens (not shown) that transmits the reflected pulse into various portions of the CCD array based on the angles of the triangle 270. The CCD array can determine what angle the reflected light came back at and from that angle it can calculate the distance to the object 260.

Figure 4:
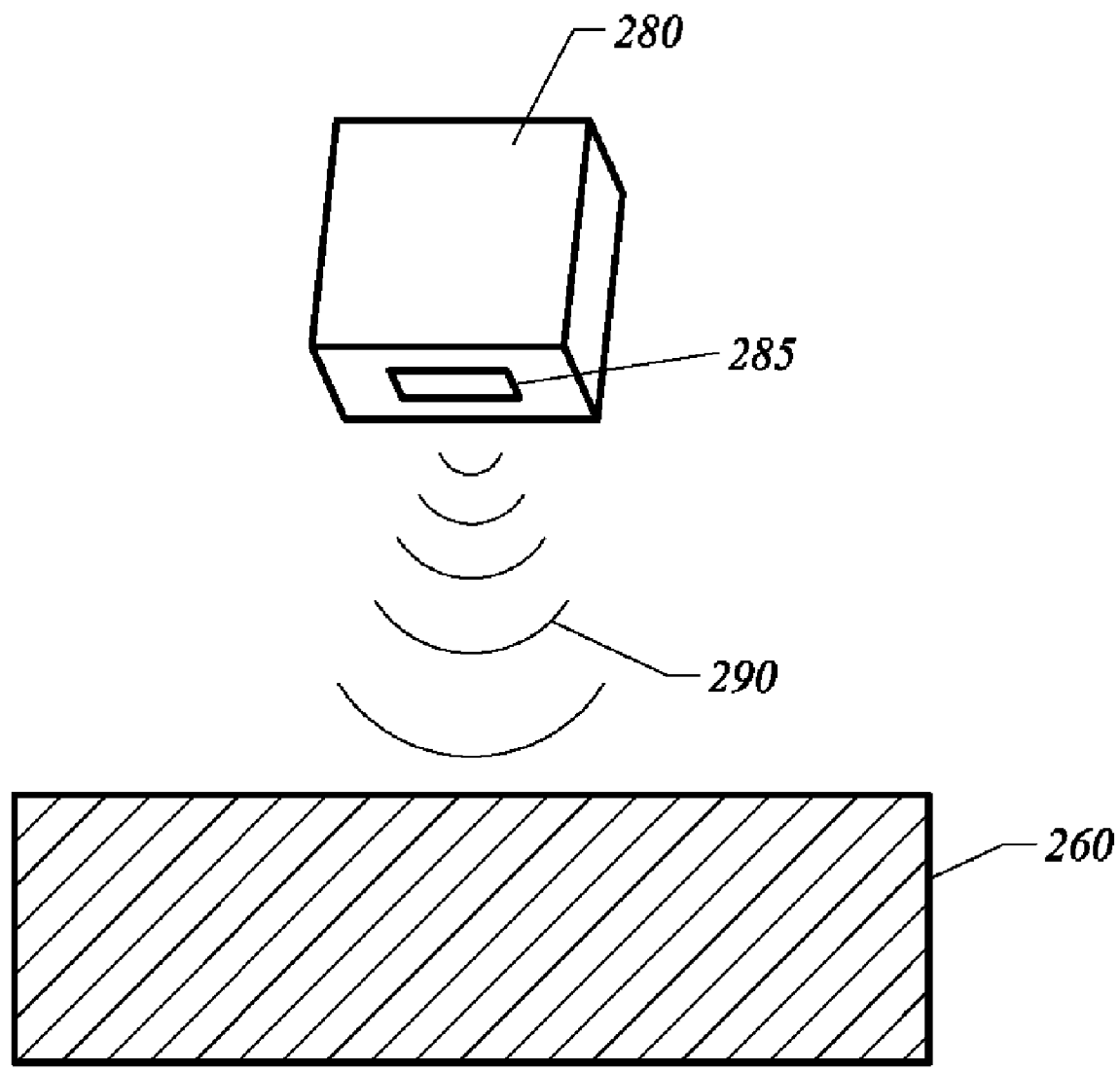
FIG. 4 shows and ultrasonic distance sensor as part of an electronic alignment device according to the present invention.

FIG. 4 shows an ultrasonic distance sensor 280 as part of an electronic alignment device 100 according to the present invention. An ultrasonic distance sensor 280 uses high frequency sound to measure to distance to an object 260. An ultrasonic sound pulse 290 is generated from a transmitter 285. A corresponding ultrasonic receiver (not shown) listens for an echo of the pulse 290 to be reflected back after the pulse hits an object 260. The time between the pulse 290 from the transmitter 285 and the reception of the echo by the receiver determines the distance to the object 260. Laser distance sensors (not shown) work in substantially the same way as the ultrasonic distance sensors 280, the obvious difference being the use of laser light rather than a sound pulse 290.

Figure 8:
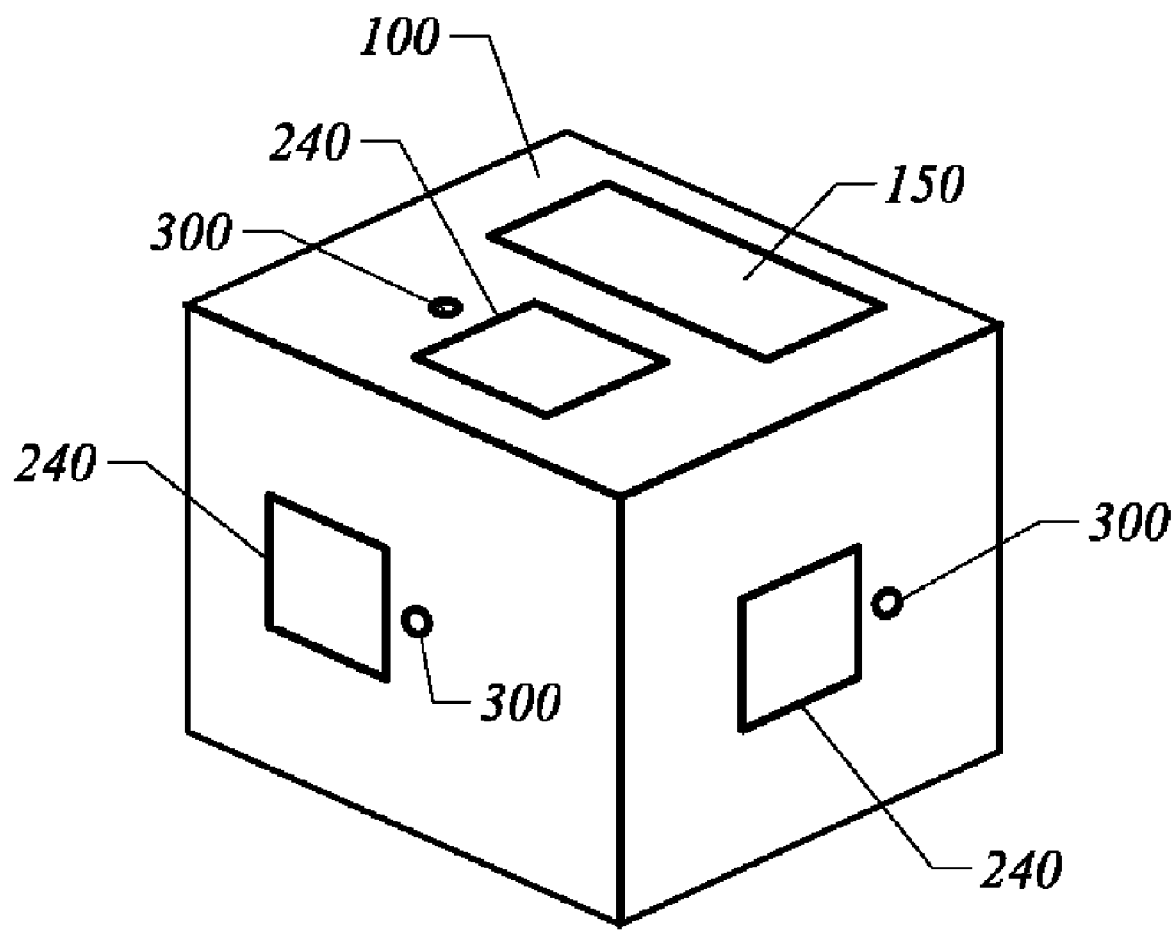
FIG. 8 shows an electronic alignment device according to the present invention configured to determine distances along three axes.

In various embodiments, distance sensors 240 may also be used to measure distances, areas, and volumes. To measure volume, three distance sensors 240, each aligned with one of the three axes of the reference frame 170. One distance sensor 240 can measure distance along each axis. FIG. 8 shows an electronic alignment device according to the present invention configured to determine distances along three axes. The product of the distances results in a volume. Any two distances can be used to calculate an area. By measuring the distances simultaneously, the user avoids the problems of previous measuring devices and gets a better result since the user can be assured that the measurements were taken from the same location. In other various embodiments the accelerometers 110 may be eliminated from the device, resulting in a three dimensional distance measuring apparatus without electronic alignment. Optionally, laser 300 or other light projecting devices that project one or more lines of visible light from the device 100 may be incorporated into the device 100 and aligned with the distance sensors 240 to help align the device 100 and show the user where the measurements will be taken.

The microcontroller 120 is the computing and processing unit for the device 100. The microcontroller 120 has computer code operable in the microcontroller 120 that provides computer implemented means for initializing the device 100, initializing the accelerometers 110, distance sensors 240 and or gyroscopes, resetting or establishing a zero point for the accelerometers 110, distance sensors 240 and or gyroscopes, calibrating the accelerometers 110, distance sensors 240 and or gyroscopes, calculating angles of rotation about the axes of the reference frame 170, calculating distances, reading and writing data to the memory device 140, and driving the feedback device 150.

Figure 9A:
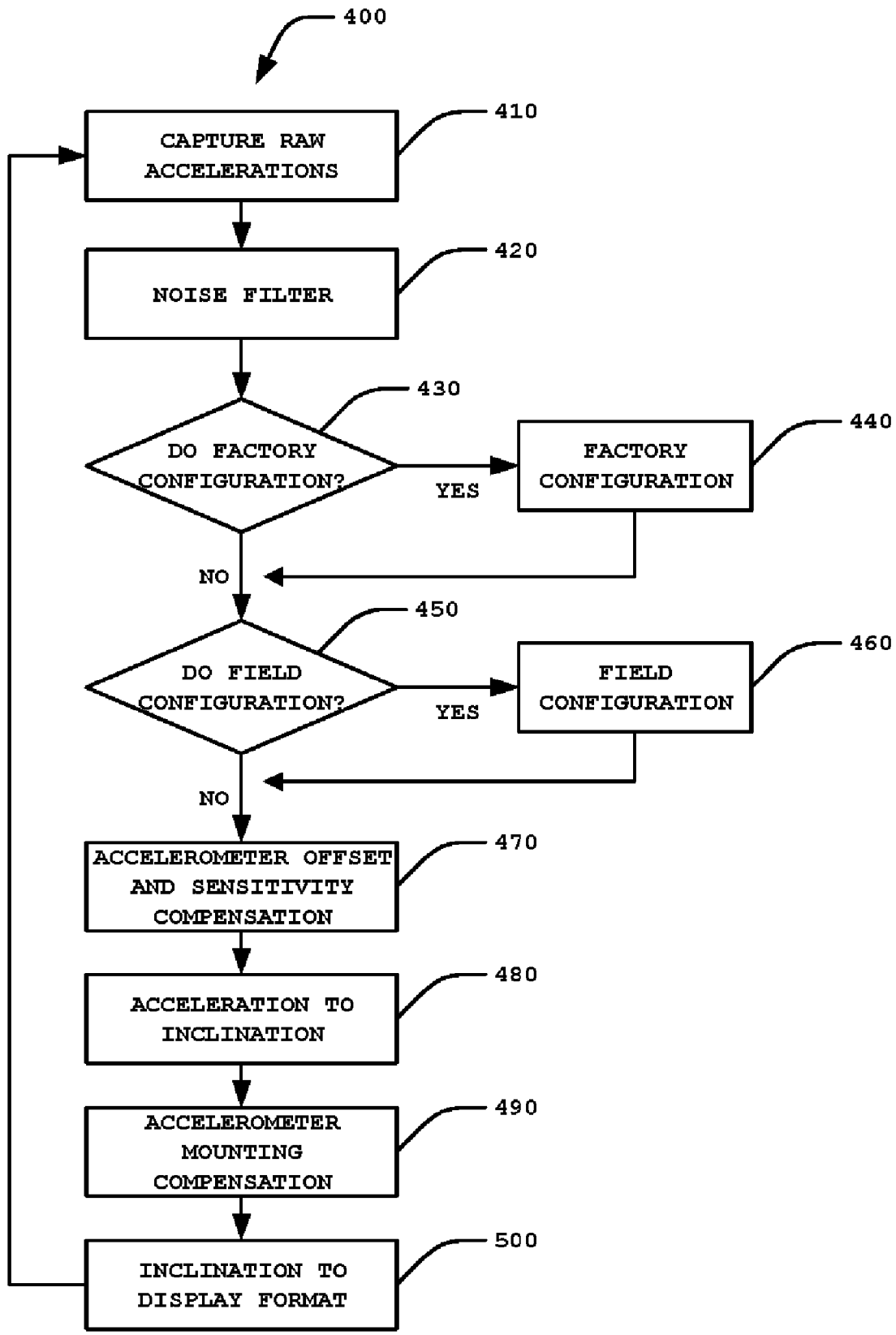
FIG. 9a shows a process for controlling an electronic alignment device according to the present invention.

FIG. 9a shows a process 400 for controlling an electronic alignment device 100 according to the present invention. At Step 410 acceleration data from the accelerometers 110 is captured. Step 410 is further explained below as it relates to FIG. 9b, which shows a process for capturing raw acceleration data for an electronic alignment device 100 according to the present invention. At step 420 a noise filter function is performed on the acceleration data from step 410. Step 420 is further explained below as it relates to FIG. 9c, which shows a process for selectively filtering acceleration data for an electronic alignment device 100 according to the present invention.

At step 430 a determination is made whether the factory configuration is needed. If yes, a factory configuration is performed at step 440, which is further explained below as it relates to FIG. 9d, which shows a process for initial setup of an electronic alignment device 100 according to the present invention. This process is typically performed on the device 100 once at the completion of manufacture and testing. If no, a determination is made at step 450 to conduct a field calibration. If yes, a field calibration is performed at step 460, which is further explained below as it relates to FIG. 9e, which shows a process for field calibration of an electronic alignment device 100 according to the present invention. This process can be performed by users of the device 100.

If no at step 450, offset and sensitivity compensations are applied to accelerometer 110 data at step 470. Accelerometer 110 offset and sensitivity compensations are stored in the memory device 140 during the factory configuration, step 440. In the case of digital accelerometers 110, the offset value typically represents the zero gravity (0G) duty cycle. The sensitivity values typically represent the maximum and minimum duty cycles (+1G and −1G respectively). The acceleration values on each axis are calculated for offset and sensitivity in the same formula: ACCELERATION=(DUTY CYCLE−OFFSET)/SENSITIVITY. Some accelerometers 110 require offset compensation and sensitivity compensation due to temperature changes. Temperature offset compensation and temperature sensitivity compensation can also be applied in this step. In other embodiments, other calculation techniques, known in the art, may be used to determine orientation of device 100 about an axis of rotation.

At step 480 the acceleration data on each axis is converted to an angle, ANGLE(measured). In various embodiments, an ARCTANGENT calculation is used on the output of each accelerometer 110 to determine the orientation with respect to the Earth's gravity. The ARCTANGENT of the output of one accelerometer 110 (e.g., "Output 1") over another accelerometer 110 (e.g., "Output 2"). For example: ANGLE(measured)=ARCTAN(Output 1/Output 2) results in the orientation of device 100 about an axis of rotation perpendicular to both accelerometers 110. In other embodiments, other calculation techniques, known in the art, may be used to determine orientation of device 100 about an axis of rotation.

At step 490 mounting compensation is applied to the angular data from step 480 above. Mounting compensation compensates for differences between the mounting of the accelerometers 110 and the plumb or level position of the device 100. For example, due to wear, damage, usage, or the like, the alignment between of the accelerometers 110 relative to the device 100 may change over time. The mounting offset values determined through the field calibration in step 460 synchronize the mounting of the accelerometers 110 to the plumb or level position of the device 100. Mounting offset values are stored as angles during field calibration in step 460. The reported angle, ANGLE(reported) is determined as a function of the measured angle adjusted by the mounting offset. As a related function, there can be provisions for a user to "zero" the device 100 at an orientation that is off of the axes of the reference fame 170. For example, the user may want to "zero" the device 100 at a forty-five degree angle to the horizontal. The reported angle would be given relative to this user defined "zero" point.

At step 500 the reported angle can be converted from a known format, such as degrees, into another desired format, such as slope or percent of slope. Other formats may also be used. As further discussed below, additional calculations and computations may also be made on the accelerometer 110 data. Following step 500, the process returns to step 410 to capture new data from the accelerometers 110.

Figure 9B:
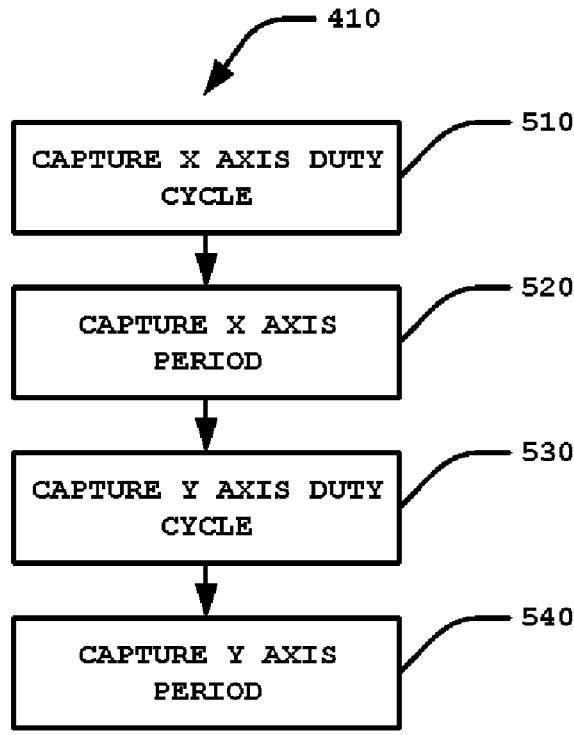
FIG. 9b shows a process for capturing raw acceleration data for an electronic alignment device according to the present invention.

As mentioned above, at step 410 acceleration data from the accelerometers 110 is captured. FIG. 9b shows a process for capturing raw acceleration data for an electronic alignment device 100 according to the present invention. Raw accelerations, or the effect of gravity, are captured on each accelerometer 110. The following example is based on a two-axis (X and Y) digital accelerometer 110 configuration. A three-axis accelerometer 110 configuration would require additional steps for the third axis. Furthermore, depending on the type of accelerometer 110, accelerations are captured as voltage levels (analog accelerometers 110) or duty cycles (digital accelerometers 110). At step 510 the duty cycle for a first accelerometer 110 is captured. Digital accelerometers 110 provide acceleration data on each axis as a duty cycle. For example, if an accelerometer 110 is capable of measuring 1G, a fifty percent duty cycle represents 0G, which would represent an axis parallel to the ground. A one hundred percent duty cycle would represent 1G, which is an axis perpendicular to the ground. At step 520, the period for the first accelerometer 110 is captured, where period represents the time to complete one duty cycle. At steps 530 and 540, duty cycle and period for the second accelerometer 110 are captured.

Figure 9C:
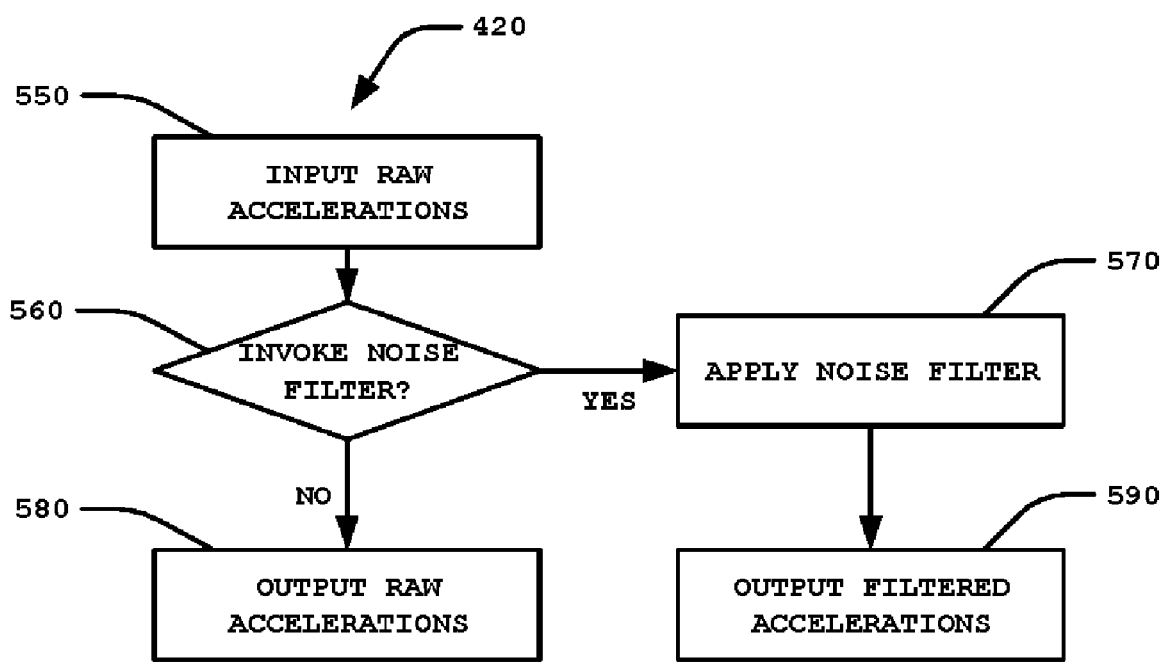
FIG. 9c shows a process for selectively filtering acceleration data for an electronic alignment device according to the present invention.

As mentioned above, at step 420 a noise filter can be applied to the raw acceleration data. FIG. 9c shows a process for selectively filtering acceleration data for an electronic alignment device 100 according to the present invention. The raw acceleration data is received from step 550. At step 560, a determination is made whether to filter the acceleration data. In various preferred embodiments, the raw acceleration data is compared to a weighted average of acceleration data sets. If the new raw acceleration data are substantially different from the weighted average, then it is assumed that the orientation of the accelerometers 110 has changed dramatically and the noise filter is bypassed and the raw acceleration data is output at step 580. If the new acceleration data is substantially similar to the weighted average, then it is assumed that orientation of the accelerometers 110 has changed only slightly, if at all, and a noise filter, in this case a weighted average, is applied to the acceleration data and the filtered acceleration data is output at step 590. Other forms of noise filters, whether they are implemented though hardware, software, or a combination of hardware and software, may also be used.

As mentioned above at step 440, a factory configuration may be performed on the device 100. FIG. 9d shows a process for initial setup of an electronic alignment device 100 for an electronic alignment device according to the present invention. Described herein is an example configuration for a two-axis (X and Y) accelerometer 110. This provides 360 degrees of resolution about a single axis. Other implementations may include resolution about additional axes and require additional configuration steps. At step 600, the user is instructed to position the device 100 upright. At step 610 the value of the Y axis is captured in its minimum value position. At step 620 the user is instructed to rotate the device 100 ninety degrees to right. At step 630 the value of the X axis is captured at its maximum value. At step 640 the user is instructed to rotate the device 100 an additional ninety degrees to the right to the 180 degree position. At step 650 the value of the Y axis is captured at its maximum value. At step 660 the user is instructed to rotate the device 100 an additional ninety degrees to the 270 degree position. At step 670 the value of the X axis is captured at its minimum value. At step 680 the factory offset values for each axis are determined as the average of the minimum and maximum values for that axis. The offset compensation values are stored in memory device 140. Some accelerometers 110 also require offset compensation due to temperature changes. Temperature offset compensation values can optionally be stored here. At step 690 the factory sensitivity values for each axis are determined as one-half of the difference of the maximum and minimum values for each axis. The sensitivity values are stored in memory device 140. Some accelerometers 110 also require sensitivity compensation due to temperature changes. Temperature sensitivity values can optionally be stored here. Other methods and processes of factory configuration and calibration may also be used, including, but not limited to other methods and processes of determining factory offset values and factory sensitivity values.

Figure 9E:
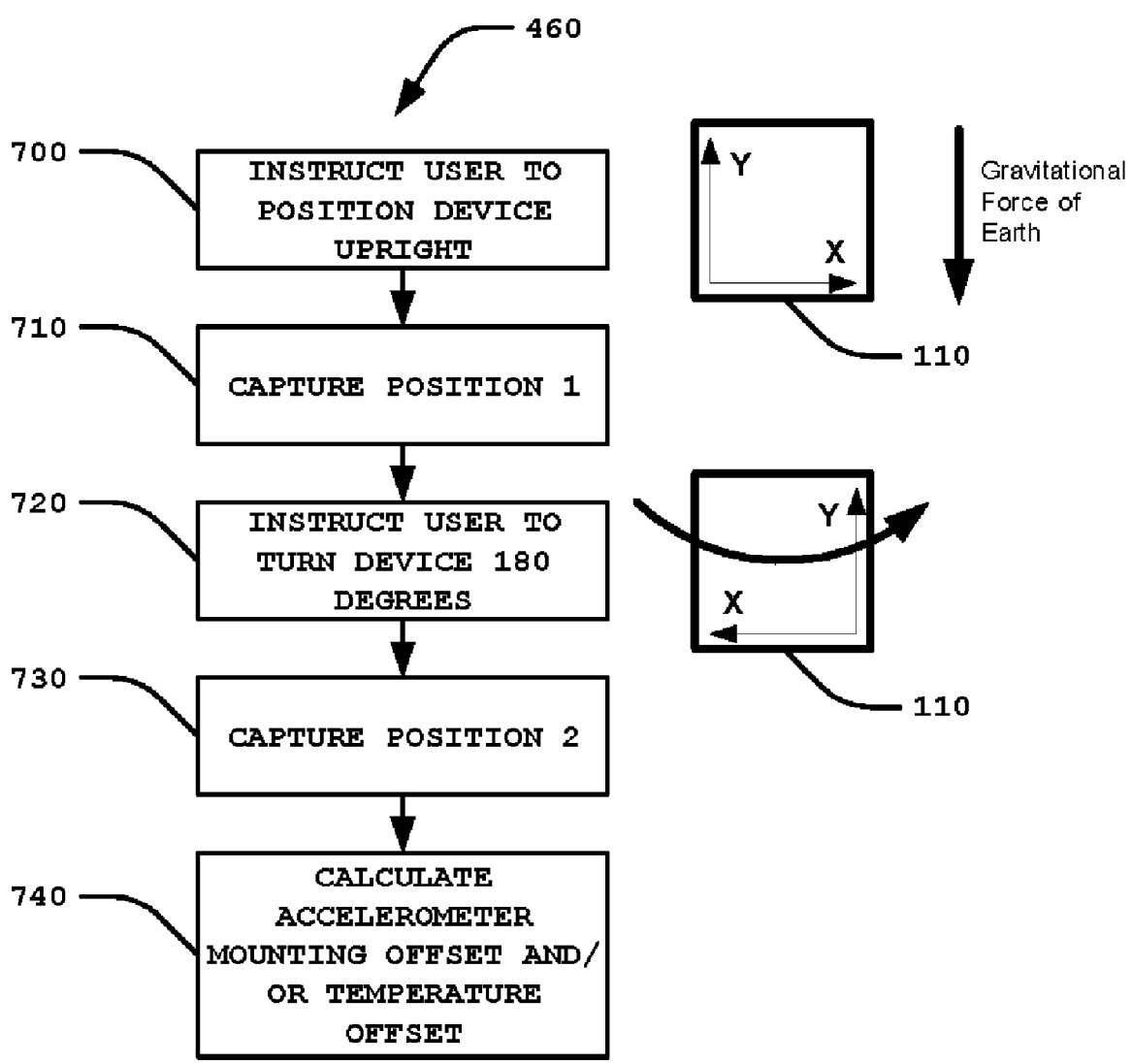
FIG. 9e shows a process for field calibration of an electronic alignment device according to the present invention.

As mentioned above at step 460, a field calibration may be performed on the device 100. FIG. 9e shows a process for field calibration of an electronic alignment device 100 according to the present invention. As with the factory configuration discussed above, described herein is an example field calibration for a two-axis (X and Y) accelerometer 110 configuration. This provides 360 degrees of resolution about a single axis. Other implementations may include resolution about additional axes and require additional calibration steps. At step 700, the user is instructed to position the device 100 upright. At step 710 the position of the device 100 is captured (capture position 1). At step 720 the user is instructed to spin the device 100 180 degrees. At step 730 the position of the device 100 is captured again (capture position 2). At step 740 the mounting offset value is determined as the average of the two capture positions. The field calibration process is used to account for errors in accelerometer 110 mounting. Since the mounting offset can change with usage, the field calibration process can be done by users of the device 100 to re-zero the device 100. Field calibration can also allows changes in temperature to be factored into the accelerometer 110 data if it is not accounted for elsewhere. Other methods and processes of field configuration and calibration may also be used, including, but not limited to other methods and processes of determining mounting offset values.

Optionally, the microcontroller 120 has computer code that provides computer implemented means for a computational engine for engineering, survey, construction, architectural, and other calculations. The computational engine allows the device 100 to acquire measurements from the accelerometers 110, distance sensors 240 and or gyroscopes, perform calculations on the measurements, and convert them into design, construction, or other useful parameters. For example, the microcontroller 120 can include calculations for determining pitch of a roof, twist and or deflection of a beam, and elevation change between survey markers from accelerometer 110, distance sensor 240 and or gyroscope measurements. Other calculations can include, but are not limited to, volume of a room, penetration rate of a drill, material estimation for painting, roofing or siding, angle of a table saw blade, hand tool sharpening angles, step or stringer layout, or rafter and joist design. Additionally, the microcontroller 120 can include computer code that provides computer implemented means for converting units of measure into other units, such as radians to degrees or SI units to English units and vice versa. The computer code can include a data lookup table or other means known in the art for accessing stored information. Lookup table information can include data specific to fields or endeavors, such as cabinet making, framing, roofing, siding, painting, decorating, tiling, machining, landscaping, construction, automotive repair, recreational vehicle operation, or hobby modeling, just to name a few. For example, in the construction field, lookup table data may include, but is not limited to board design values, girder spans, R-values, surveyor conversion charts, properties of materials, or measurement conversions.

In various embodiments, the device 100 may include hardware and software that allows the device 100 to communicate with an external computer (not shown) or computing device. The communication hardware and software can include, but is not limited to, a wire line connector, wireless infrared port, or wireless radio frequency devices using communication protocols known in the art. The communication hardware and software can allow the updating, revising or configuring of the computer code operating in the microcontroller 120. The communication hardware and software can also allow the updating, revising or configuring of other user settings in the device 100, microcontroller 120, or memory device 140. The communication hardware and software can also provide for the transfer of data stored on the device 100 to the external computer for further manipulation, calculations, or archiving.

The feedback device 150 can be any one or any combination of visual, audible, or tactile feedback mechanisms. Visual feedback can be in any one or any combination of alpha, numeric, graphical or indicator formats. In various embodiments, a liquid crystal display 310 (LCD) displays the angles of rotation and or the distance measurements. A light emitting diode (LED) array 320 or other visual feedback means known in the art may also be used to give visual feedback. Audible feedback can be in the form of buzzers or tones that activate when predetermined conditions are met, such as a certain distance of travel has been made or the device 100 has rotated more than a predetermined amount about one or more of the axes of rotation. Voice synthesis may also be used for audible feedback. Tactile feedback can be in to form of a Braille pad, coded vibrations, or other tactile feedback means known in the art.

The power source 160 is preferably a battery of some type known in the art, which would be integral to the device 100. Having an integral power source 160 eliminates the need for the device 100 to be tethered to a power source 160 via a power cord (not shown).

Figure 5A:
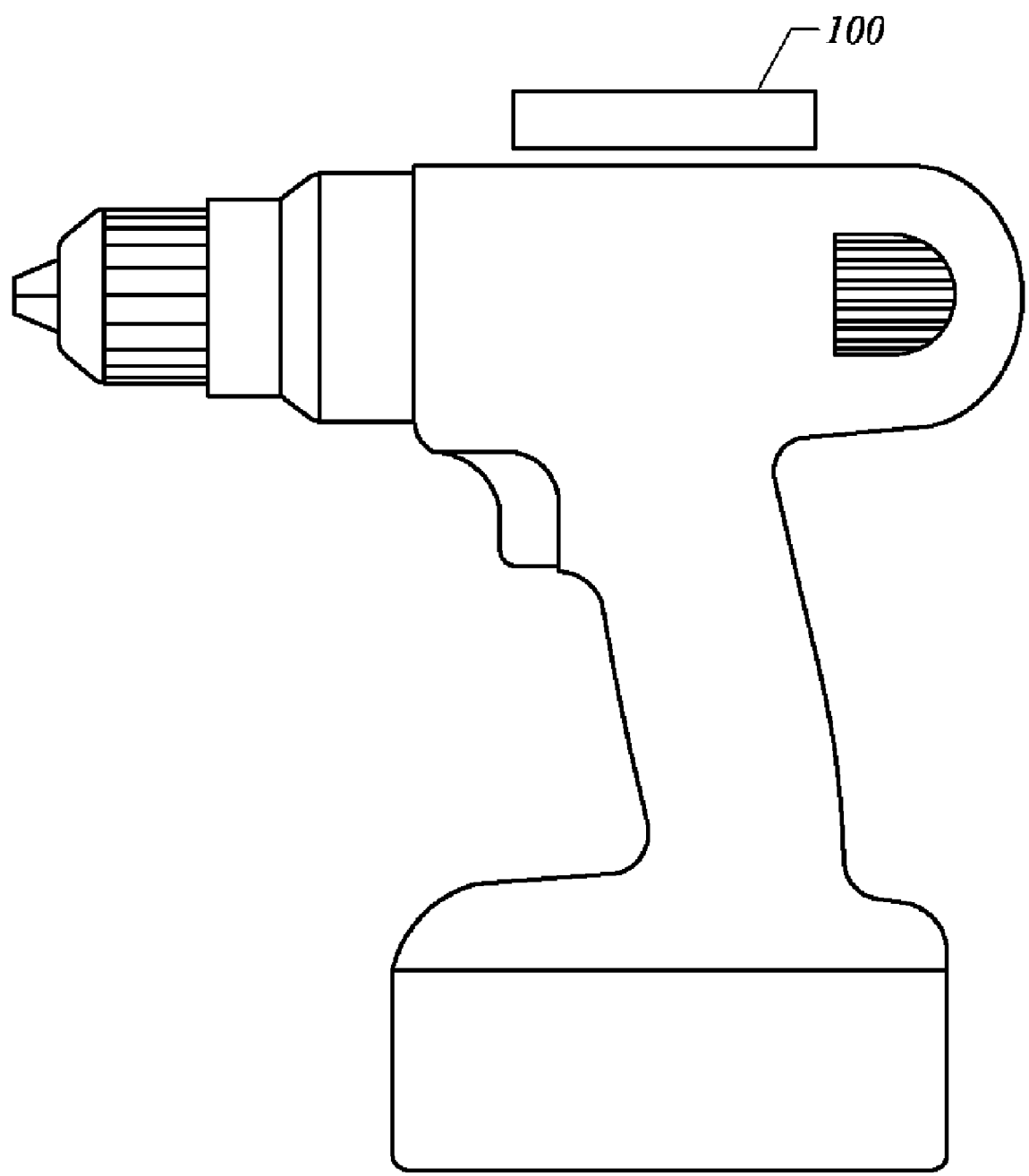
FIG. 5a shows a portable drill having an electronic alignment device according to the present invention mounted thereon in a first position.
Figure 5B:
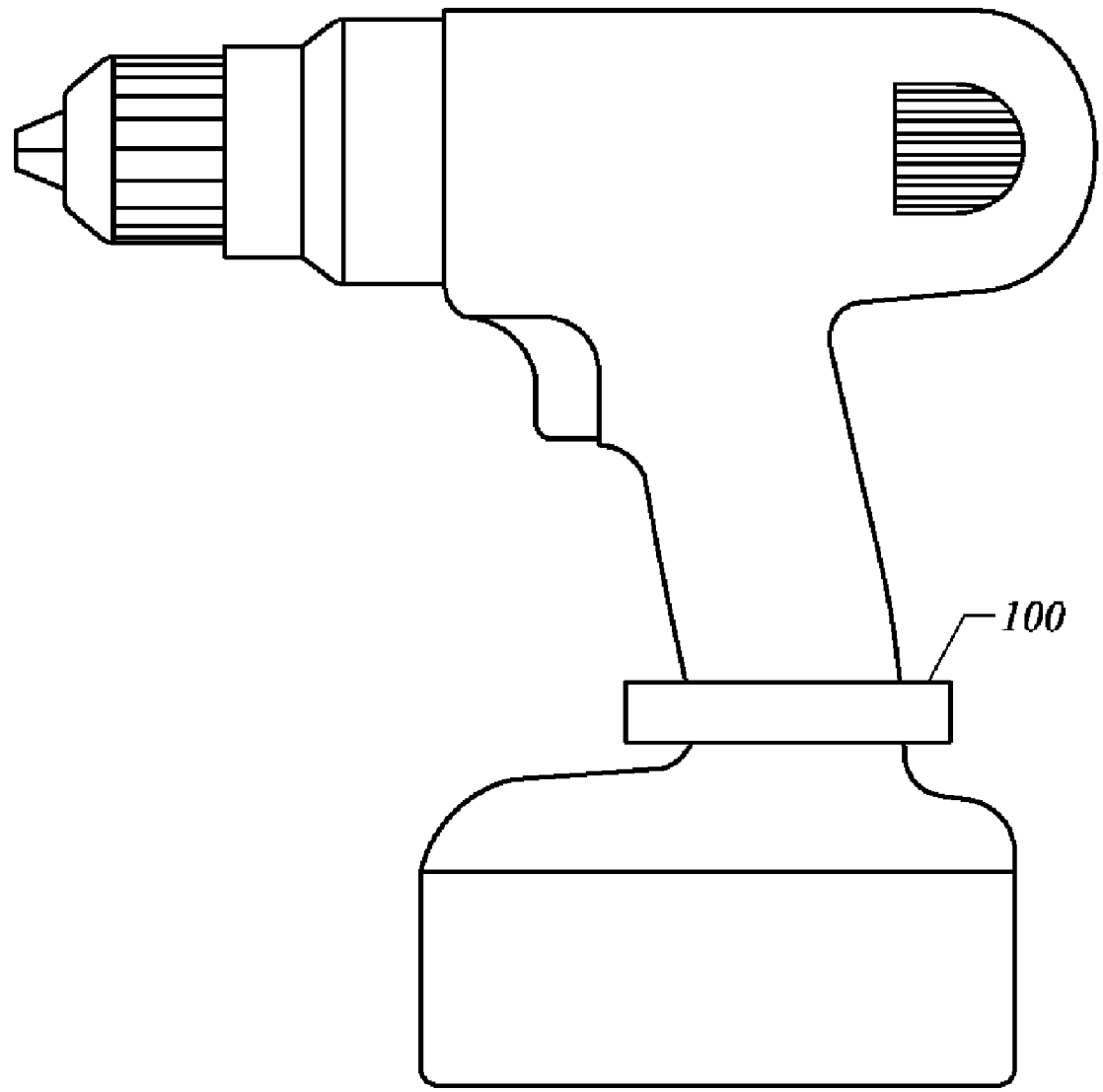
FIG. 5b shows a portable drill having an electronic alignment device according to the present invention mounted thereon in a second position.
Figure 6:
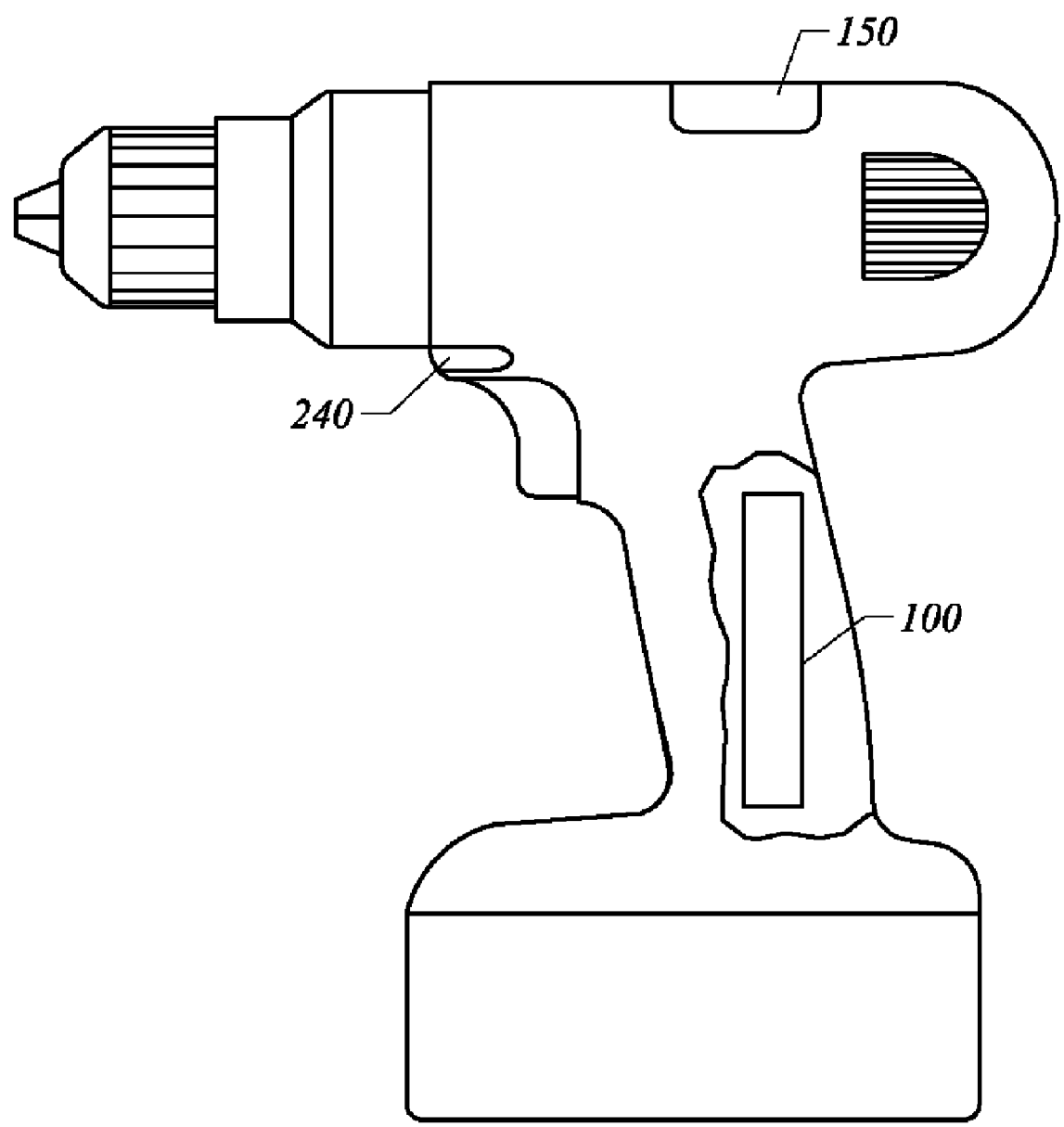
FIG. 6 shows a portable drill having an electronic alignment device according to the present invention built into a drill.

The device 100 of the present invention can be incorporated as an integral part of another apparatus. For example, the present invention may be built into a drill, level, saw, powder activated driver, stud sensor, or protractor by a manufacturer. Alternately, device 100 can be a stand alone unit, as shown in FIGS. 1a and 1b, for use with or for mounting on another apparatus, such as a drill, conventional bubble type level, or other tools and devices, including, but not limited to the tools listed above. FIGS. 5a and 5b show a portable drill having an electronic alignment device 100 according to the present invention mounted thereon in first and second position respectively. In these instances the device 100 can be built into a housing 330. Preferably the housing 330 has a removable portion for accessing the power source 160, such as for replacing a battery. Preferably the housing 330 has a feedback device 150, such as a display capable of showing numbers, letters, or symbols. Ideally the feedback device 150 display is positioned to allow for easy viewing when the device 100 is being used. Optionally, feedback device 150 display can tilt and or swivel for optimal viewing. The housing 330 can also incorporate buttons 340 and or switches 350, or other input and control means known in the art, that are used to turn the device 100 on and off and to access available menu functions programmed into the microcontroller 120 or computing and processing means. Furthermore, the housing 330 can include means for attaching the device 100 to a tool or object 260. The attachment means can include, but is not limited to, magnets (not shown) located on one or more surfaces of the housing 330, or threaded portions (not shown) for receiving threaded members (not shown).

Figure 7:
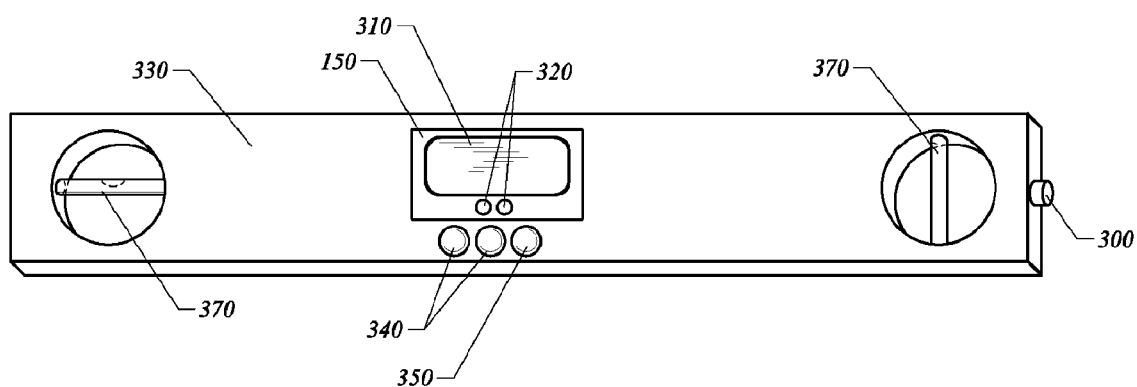
FIG. 7 shows an electronic alignment device according to the present invention having light projecting means included thereon.

In various embodiments, additional features can be added, singularly or in combination, to the device 100. For example, device 100 may include laser or other light projecting devices that project one or more lines of visible light from the device 100. FIG. 7 shows an electronic alignment device 100 according to the present invention having light projecting means, such as a laser 300, included thereon. Such lines can be used to effectively extend the edges of device 100 as well as assist in aligning the device with one or more other objects. Additionally, one or more traditional spirit or bubble levels 370 can be included in the device. Inclusion of traditional spirit or bubble level can help a user make preliminary alignments, serve as a redundant measurement technique, and or serve as a visual confirmation of the operation device 100 to a new user.

Figure 10:
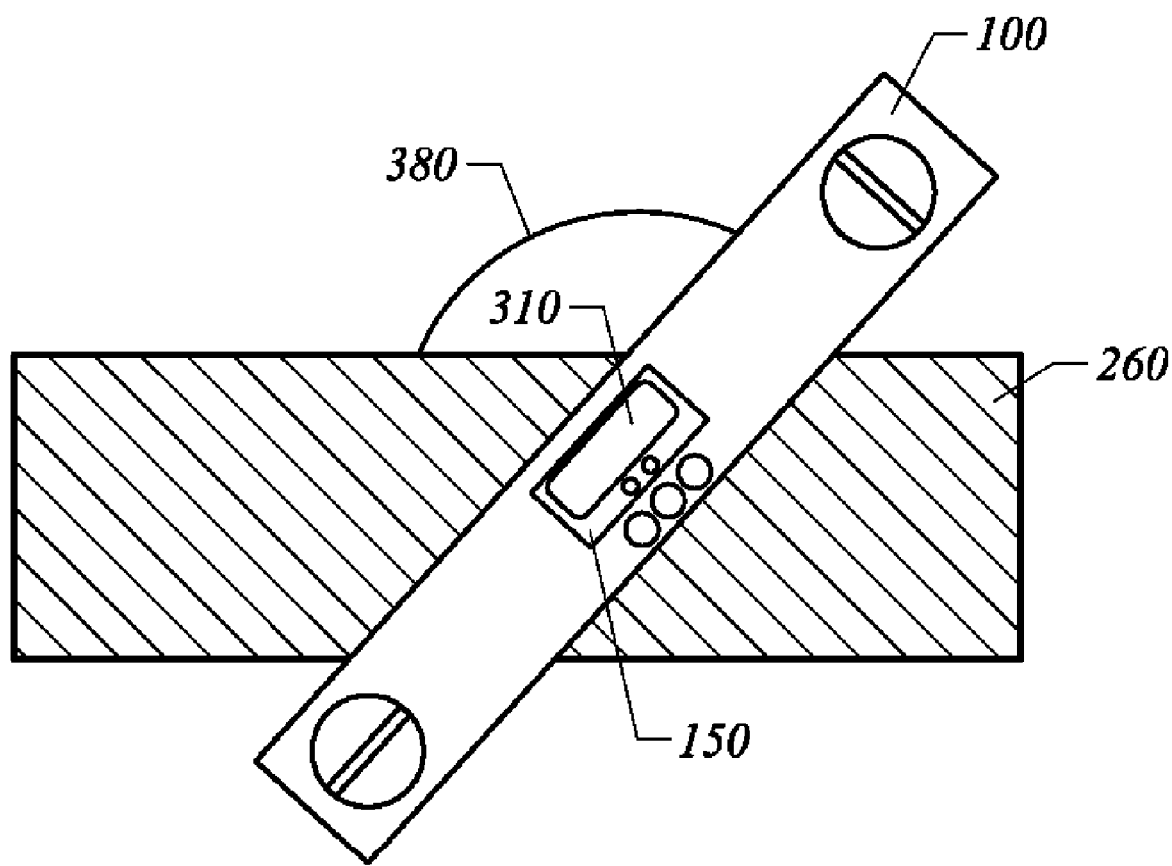
FIG. 10 shows an electronic alignment device according to the present invention as part of an electronic protractor.

FIG. 10 shows an electronic alignment device according to the present invention as part of an electronic protractor. When used as an electronic protractor, the device 100 can be used, for example, as a guide for finding and scribing a desired angle 380 on an object 260.

While specific embodiments have been illustrated and described, numerous modifications come to mind without significantly departing from the spirit of the invention and the scope of protection is limited by the scope of the accompanying claims.

What is claimed is:

1. An electronic alignment device comprising:
at least two accelerometers, said accelerometers being mutually perpendicular to one another;
a computing and processing device, said computing and processing device comprising computer implemented means for enabling a user to field calibrate said accelerometers, calculating at least one angle of rotation about an axis in a reference frame, reading and writing data from and to a memory device, and sending data to a feedback device for providing feedback to a user; and
means for electrically connecting said accelerometers, said computing and processing device, said feedback device, said memory device and a power source, wherein said computer implemented means for enabling a user to field calibrate said accelerometers includes providing instructions to a user to position said electronic device to capture a first set of positional data, and then providing instructions to the user to turn said electronic alignment apparatus 180° degrees to enable said electronic alignment device to capture a second set of positional data and average said first and second sets of captured data.

2. An electronic alignment device comprising:
at least two accelerometers, said accelerometers being mutually perpendicular to one another;
at least two distance sensors, said distance sensors being mutually perpendicular;
a computing and processing device, said computing and processing device comprising computer implemented means for enabling a user to field calibrate said accelerometers, calibrating said distance sensors, determining a distance from each of said distance sensors, determining an area from the product of said determined distances, reading and writing data from and to a memory device, and sending data to a feedback device for providing feedback to a user; and
means for electrically connecting said distance sensors, said computing and processing device, said feedback device, said memory device and a power source, wherein said computer implemented means for enabling a user to field calibrate said accelerometers includes providing instructions to a user to position said electronic device to capture a first set of positional data, and then providing instructions to the user to turn said electronic alignment device 180° degrees to enable said electronic alignment device to capture a second set of positional data and average said first and second sets of captured data.

3. An electronic alignment apparatus comprising:

a housing;

input and control means externally mounted on said housing;

a feedback device for providing feedback to a user operatively mounted in said apparatus;

at least two accelerometers, said accelerometers being mutually perpendicular to one another, said accelerometers internally mounted in said housing;

first and second distance sensors pointed in the same direction, said distance sensors operatively mounted in said housing;

a computing and processing device, said computing and processing device comprising computer implemented means for enabling a user to field calibrate said accelerometers, calculating first and second distances, calculating an angle of rotation about a first axis in a reference frame, calculating an angle of rotation about a second axis in said reference frame, reading and writing data from and to a memory device, receiving input from input and control means, and sending data to said display device, said computing and processing device internally mounted in said housing; and means for electrically connecting said accelerometers, said distance sensors, said computing and processing device, said memory device, said display and a power source, said electrically connecting means internally mounted in said housing, wherein said computer implemented means for enabling a user to field calibrate said accelerometers includes providing instructions to a user to position said electronic apparatus to capture a first set of positional data, and then providing instructions to the user to turn said electronic alignment apparatus 180° degrees to enable said electronic alignment apparatus to capture a second set of positional data and average said first and second sets of captured data.

4. An electronic alignment apparatus comprising:

a housing;

input and control means externally mounted on said housing;

a feedback device for providing feedback to a user operatively mounted in said apparatus;

at least two accelerometers, said accelerometers being mutually perpendicular to one another, said accelerometers internally mounted in said housing;

a gyroscope, said gyroscope operatively mounted in said housing;

a computing and processing device, said computing and processing device comprising computer implemented means for enabling a user to field calibrate said accelerometers, calculating an angle of rotation about a first axis in a reference frame, calculating an angle of rotation about a second axis in said reference frame, reading and writing data from and to a memory device, receiving input from said input and control means, and sending data to said display device, said computing and processing device internally mounted in said housing; and means for electrically connecting said accelerometers, said gyroscope, said computing and processing device, said memory device, said display and a power source, said electrically connecting means internally mounted in said housing, wherein said computer implemented means for enabling a user to field calibrate said accelerometers includes providing instructions to a user to position said electronic apparatus to capture a first set of positional data, and then providing instructions to the user to turn said electronic alignment apparatus 180° degrees to enable said electronic alignment apparatus to capture a second set of positional data and average said first and second sets of captured data.

* * * * *